United States Patent [19]

Baum

[11] Patent Number: 4,940,309

[45] Date of Patent: Jul. 10, 1990

[54] TESSELLATOR

[76] Inventor: Peter S. Baum, 9 Eustis St., #2R, Cambridge, Mass. 02140

[21] Appl. No.: 303,956

[22] Filed: Jan. 25, 1989

Related U.S. Application Data

[63] Continuation of Ser. No. 40,243, Apr. 20, 1987, abandoned.

[51] Int. Cl.[5] ............................................. G02B 27/14
[52] U.S. Cl. ..................................... 350/171; 350/612
[58] Field of Search ............... 350/169, 171, 174, 613, 350/279, 280, 124, 129, 626, 627, 448, 445, 449, 612; 354/68, 69, 103, 104, 110, 112, 118

[56] References Cited

U.S. PATENT DOCUMENTS

| | | | |
|---|---|---|---|
| 632,573 | 9/1899 | Ives ........................................ | 354/104 |
| 1,328,291 | 1/1920 | Parker . | |
| 1,871,281 | 8/1932 | Savage . | |
| 2,017,190 | 10/1935 | Waide ..................................... | 88/16.4 |
| 2,045,093 | 6/1936 | Newcomer .......................... | 350/445 |
| 2,182,142 | 12/1939 | Ball et al. ............................. | 354/104 |
| 2,627,199 | 10/1948 | O'Brien ................................ | 88/1 |
| 3,370,271 | 2/1968 | Van Dalen et al. ............. | 340/146.3 |
| 3,419,329 | 12/1968 | Vogeley et al. ..................... | 350/171 |
| 3,756,696 | 9/1973 | Gardiner .............................. | 350/169 |
| 4,167,756 | 9/1979 | Smith .................................... | 350/174 |
| 4,367,009 | 1/1983 | Suzuki ................................... | 350/6.5 |
| 4,487,477 | 12/1984 | Holms et al. ........................ | 350/172 |
| 4,531,054 | 7/1985 | Suzuki .................................. | 250/201 |
| 4,609,253 | 9/1986 | Perisic ................................... | 350/174 |

FOREIGN PATENT DOCUMENTS

| | | | |
|---|---|---|---|
| 0296335 | 12/1986 | Japan ..................................... | 354/112 |
| 0706813 | 12/1979 | U.S.S.R. ............................... | 354/69 |
| 421100 | 12/1934 | United Kingdom ................ | 350/171 |

OTHER PUBLICATIONS

"Fundamentals of Optics", Jenkins & White, Third Ed. 1957, p. 46.

Primary Examiner—Rodney B. Bovernick
Assistant Examiner—Ronald M. Kachmairik

[57] ABSTRACT

A means of converting between images, or other whole wavefronts, and separated, composing segments of this whole. The purpose is to allow many, less capable sensors or generators to be used in place of a single, more capable one. Applications can be found in the design of scanners, cameras, projectors, and audio speakers. The invention consists of a single focusing means (20), one or more reflective means (24), and a plurality of sensors or generators (90 and 92). Representative designs are shown with the following characteristics:

One dimensional tessellation using simple mirrors.
Two dimensional tessellation using glass with mirrored sections.
Extensibility to support an arbitrary number of composing segments.
Sensing or generating elements placed together on the same plane.
Inconsequential or easily corrected image distortion.
Easy and inexpensive manufacture.
Easy alignment.

10 Claims, 15 Drawing Sheets

TESSELLATOR

This application is a continuation of application Ser. No. 40,243, filed Apr. 20, 1987, now abandoned.

BACKGROUND

1. Field of Invention

This invention relates to image generation, image detection, and the creation and use of a plurality of image sub-sections.

2. Background—Discussion of Prior Art

A variety of high resolution image sensors and display devices are widely employed in scanners, graphic display terminals, and cameras. Sometimes the cost of such imaging systems can be lowered by substituting two or more relatively inexpensive components for a single, more expensive one. For example, if a high resolution CCD (Charge Couple Device) area array is used in a camera, several smaller arrays may be used instead. These smaller arrays can be manufactured with higher yields and therefore at a lower cost. The relationships between yield, defect rate, and cost are made clearer by considering the following example: if there is a 0.5 probability that a 512×512 device will have at least one defect, then a 2048×2048 device will have a 0.9999847 probability of having at least one defect, i.e., on the average, only one defect free device will be produced out of 65536 units.

If several 512×512 components can be made to function as a single 2048×2048 device, the 50% yield on components can be maintained and, perhaps, manufacturing costs significantly decreased.

Other devices have characteristics which lend themselves to the application of this "divide and conquer" strategy. Large cathode ray tubes, for example, are expensive to manufacture because the supporting structure needed to maintain a large vacuum is expensive. Film-based photography represents another opportunity because film transport and development systems become disproportionately expensive as negative area is increased.

In order to use multiple imaging components, we must be able to convert an image to or from a plurality of composing image sub-sections. I call this process "tessellation" because the process is similar to creating a mosaic from sub-sections composed of individual porcelain tiles. When an object is scanned, an image of the object is broken down into a plurality of image sub-sections. When an image is projected, a plurality of image sub-sections are combined to form a single "object." For the remainder of this document, I will simplify much of the presentation by describing tessellation in terms of scanning systems. The analogous description of a tessellator used as a projector should be obvious.

Let us consider the physical position of these tessellated sub-sections created within a scanning system. If the sub-sections are physically adjacent, then the sensors must necessarily abut one another. Current technology has been able to produce buttable linear arrays, but they distort the image by producing discontinuities of one or more pixel between arrays. Area arrays which can be physically abutted are even more difficult to produce. Therefore, out of necessity, designs have separated the tessellated image sub-sections from one another. This can be accomplished in a variety of ways, using for example, multiple lenses or half-silvered mirrors. Heretofore, such systems have been costly, difficult to manufacture, difficult to align, and they have distorted the image in unacceptable ways. The present invention overcomes these disadvantages and thus demonstrates a tessellator that is inexpensive, easy to manufacture, and of a design whose image distortion is easily corrected. Alignment is generally easy to effect, but the means of doing so depends upon specific implementation details and system requirements.

BACKGROUND—OBJECTS AND ADVANTAGES

Accordingly, I claim the following objects and advantages of the invention: to provide an image tessellating device which is inexpensive, easy to manufacture, easy to align, small in size, light-weight, simple in operation, does not significantly distort the image, is applicable to a large number of image sub-sections, accommodates a wide range of lenses and sensors, and allows sensors to be placed on a relatively small number of different planes.

In addition, this form of tessellator allows low cost area arrays to be combined to produce very high resolution scanners with no defects. In general, such devices require no moving parts, function at high speed, and have a long mean time to failure. Often the alignment procedure can be performed quickly and inexpensively. Because such alignment can be done using software, alignment can be effected remotely.

Maintenance is simple, and array replacement may cost less than when a single array is used. Remote sensing applications can benefit both from tessellation designs which use arrays with different imaging characteristics as well as from the redundancy inherent in using multiple sensors. Such redundancy allows for the creation of highly reliable systems.

Similar advantages apply when the device is used to combine image sub-sections to form a single image. In this case, the application space includes image projectors, such as projection television systems and photographic enlargers.

Further objects and advantages of my invention will become apparent from a consideration of the ensuing description and the accompanying drawings.

Figure 1:
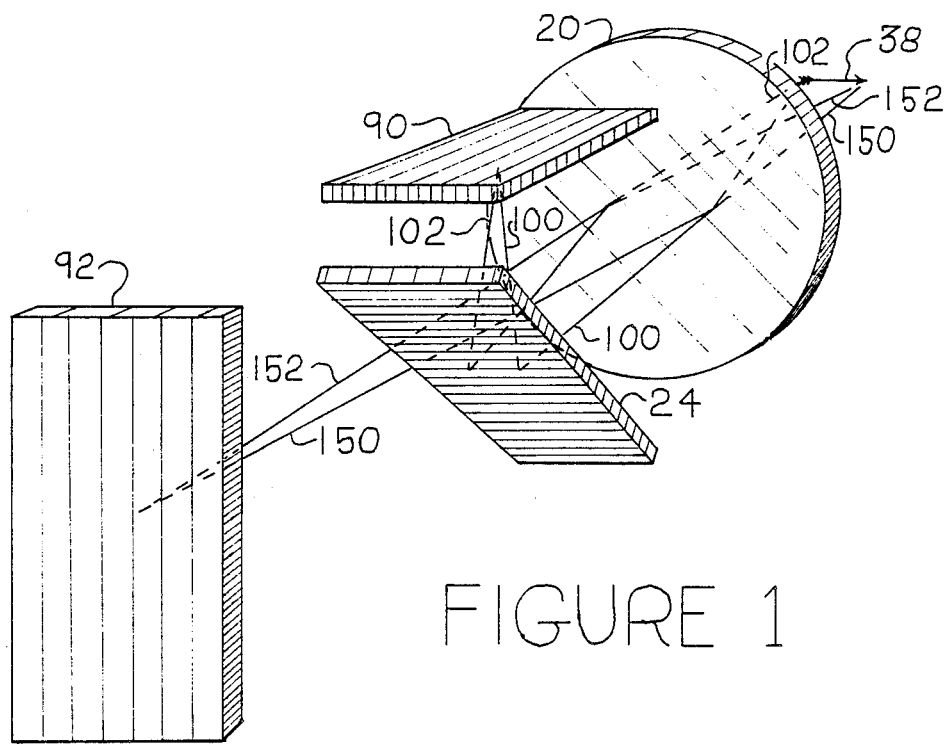
FIG. 1 is a perspective drawing showing the major components of a tessellator.

LIST OF REFERENCE NUMERALS 20 focusing means. A symbolic representation for devices such as a simple lens, a compound lens, a parabolic reflector, a lens and "folding" mirror in combination, or a pinhole lens.

22 transparent supporting structure 24 reflective surface 25 a T1 reflective means. The T1 reflective means of these drawings comprise a plurality of similarly arranged clear means and reflective means. These clear and reflective means are placed adjacent to each other in an alternating pattern within a single plane.

26 protective surface 38 object

40–59 supporting structure for sensing or generating elements

60–89 sensing or generating elements (each element is associated with a single pixel)

90–99 groups of sensing elements or generating elements (also called sensors or generators)

100–199 ray paths

200–210 intensity functions

DESCRIPTION OF INVENTION

FIG. 1 shows the major components of a tessellator. The object 38 is to be considered as a whole entity. A means of focusing rays is schematically represented by the circular solid 20. Although suggestive of a simple lens, it might in fact, represent a compound lens, a lens in combination with one or more "bending" or "folding" mirrors, a pinhole lens, a parabolic mirror, or any number of other similar devices. A means of altering the path of one or more rays, for example, by reflection, is represented by the rectangular solid 24. An example of such a reflective means would be a simple mirror. A means of sensing or generating electromagnetic radiation is represented by rectangular solids 90 and 92. Examples include CCD linear arrays, CCD area arrays, cathode ray tubes, liquid crystal display chips, and photographic film. It is possible to imagine images of subsections of the object being projected through such a system. The path taken by each such image can be represented by a set of ray paths. One such set comprises ray 100 and ray 102. Another comprises ray 150 and ray 152.

Figure 2:
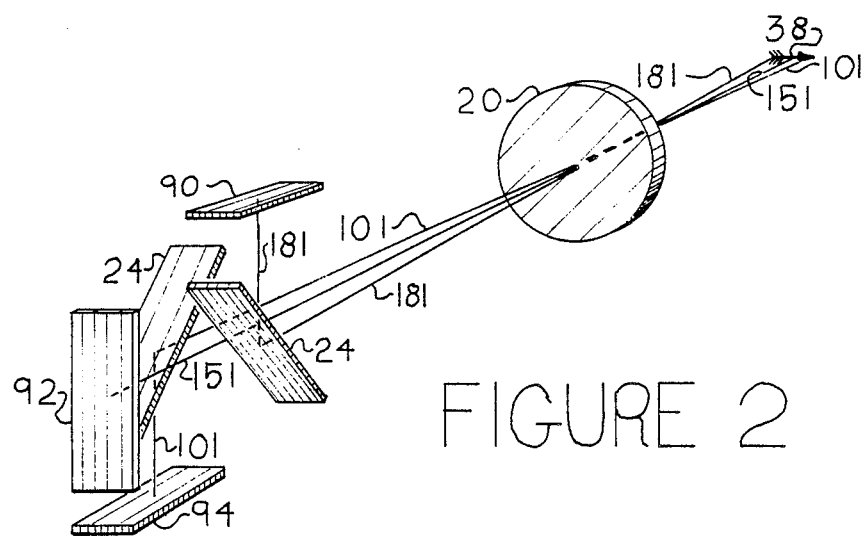
FIG. 2 is a perspective drawing showing how additional sensors might be added for increased resolution.

FIG. 2 shows that additional reflective means and sensing or generating elements can be added if more image sub-sections are required. Here a single ray is used to suggest the path taken by a sub-section as it travels between object 38 and a sensing or generating means. Ray 181 suggests the path taken by a sub-section which includes the tail of the arrow and ray 101 the path taken by a sub-section which includes the head of the arrow. FIGS. 3, 6, 7, 8, 9, 13, 14, and 15 give additional configuration possibilities and suggest still others. The choice of a specific design depends upon a number of factors including device size, sensor dimensions, characteristics of the focusing means, and required image resolution. The effect of these factors on the design will be better understood after reading the following section.

OPERATION OF INVENTION

FIG. 1 shows major components of a tessellator. Object 38 represents a whole entity. If the tessellator is being used as a sensing device, it is the whole object that is being sensed. If the tessellator is being used as a projector, it is the whole object that is being created from component image sub-section. Such sub-sections are also called segments or tiles. For descriptive purposes, I will consider only the sensing application. A projecting device is easily constructed by replacing sensors with image segment generating means, and reversing the path taken along each ray.

To make explicit the terminology being used: sub-sections of an object are called object sub-sections. Images of such object sub-sections are simply called sub-sections. Images of object sub-sections are called image sub-sections when they form a focused image, for example, on a sensing surface. Image sub-sections are combined to form an image. For projecting devices, generators create image sub-sections. These sub-sections might be displayed on a screen, thus becoming object sub-sections. Object sub-sections taken as a whole form the object. This terminology allows the same names to be applied to similar parts of both sensing and projecting tessellators.

Segments from object 38 travel along ray paths to a focusing means 20. This focusing means might be a pinhole lens, a simple camera lens, a compound lens, a lens in combination with one or more "bending" or "folding" mirrors, a parabolic reflector, or other means of focusing electromagnetic radiation. (If the focusing means were a parabolic reflector, the figure would have to be slightly modified). The segment which travels from the focusing means 20 along paths 100 and 102 is reflected by reflective means 24 and is projected onto sensor 90. The segment which travels along paths 150 and 152 continues along an unreflected path to sensor 92. The focusing means 20 focuses rays from segments of the object, called object segments, onto sensors 90 and 92 to form image segments. A complete image of the object can be reconstructed by combining these image segments. Characteristics of the focusing means, such as focal length, determine the position of sensors 90 and 92. In other words, the image is focused at a distance corresponding to the location of the sensors.

FIG. 2 shows how additional sensors might be added if the image is to be broken into more than two segments. In this case, each of three segments is directed along three distinct paths—these paths represented by chief rays 101, 151, and 181. The segment which travels along path 101 is directed by a reflective means 24 to sensor 94. Similarly, the segment which travels along path 181 is directed to sensor 90. The segment which travels along path 151 travels unreflected to sensor 92. The size, shape, and position of the sensors and reflectors can vary widely. Furthermore, some applications will implement movable mirrors to allow segments to be directed to more than one sensor.

Figure 3:
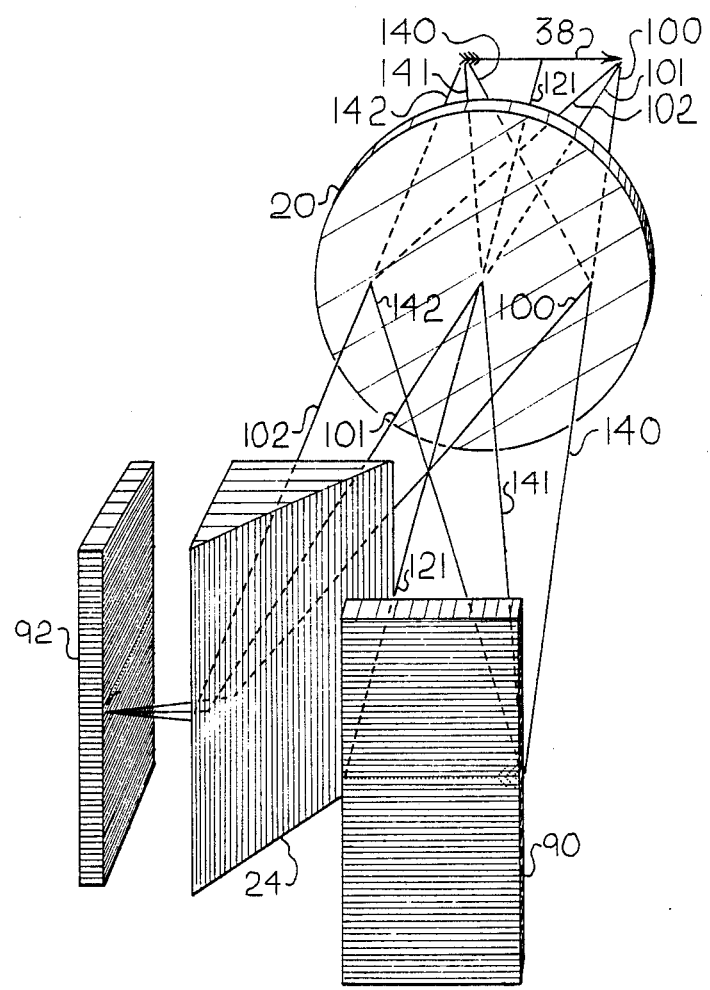
FIG. 3 is a perspective drawing showing an alternative placement of the reflective surface for a simple tessellator.

FIG. 3 shows a flint glass prism reflective means 24 directing segments to sensors 90 and 92. Both sensors intersect the plane containing ray paths 100, 101, 102, 121, 140, 141, and 142. Note how this differs from FIG.

2 which places sensors 90 and 94 out of the plane which contains the parts of the ray paths of 101, 151, and 181, which are between the focusing means 20 and the reflective means 24.

In FIG. 3, an image of the head of the arrow is directed along ray paths 100, 101, and 102 by focusing means 20, toward reflective means 24. Reflective means 24 in turn directs these rays to sensor 92. An image of the tail of the arrow is directed along ray paths 140, 141, and 142 by focusing means 20 toward sensor 90. Ray path 121 shows an image of another part of object 38 being directed by focusing means 20 to sensor 90.

Figure 4:
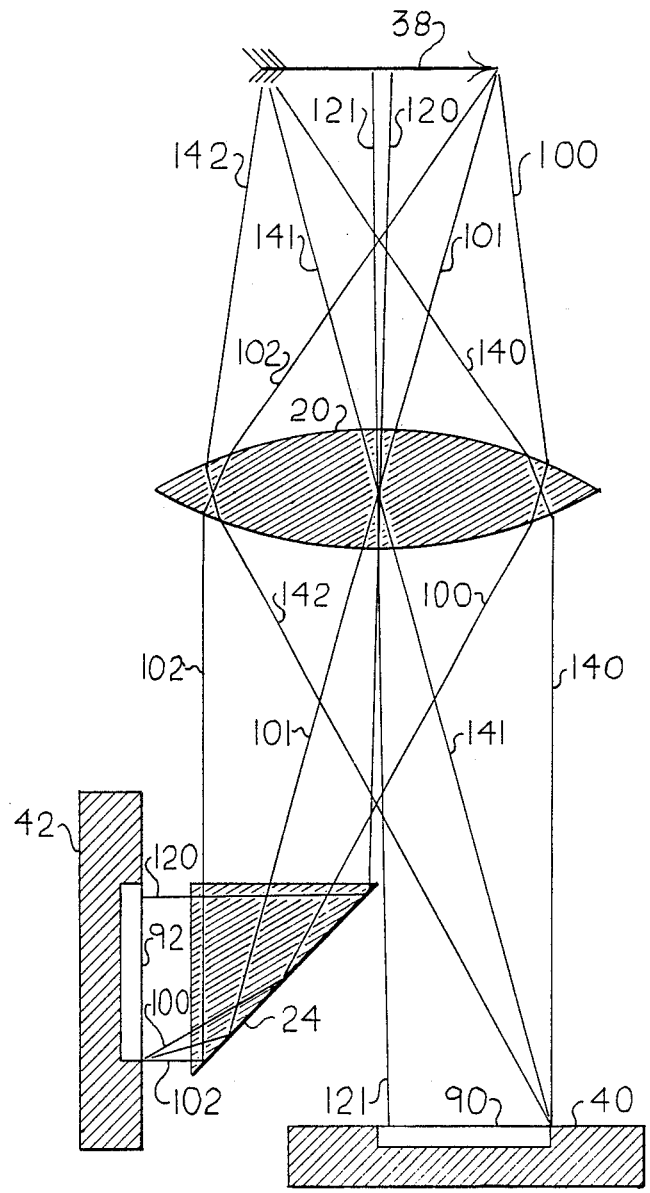
FIG. 4 is a top view of FIG. 3.

FIG. 4 is essentially a top view of FIG. 3. A few additional details have been added. First, sensors 90 and 92 are shown embedded in supporting structures 40 and 42 respectively. These supporting structures represent the physical mass of the sensing device which prevents two sensors from being abutted. Also added in FIG. 4 is ray 120, one of the paths taken from another point on object 38. This ray is directed by focusing means 20 onto sensor 92 by way of reflective means 24.

In FIG. 4, each chief ray which can be drawn between rays 120 and 121 will either eventually fall onto sensor 90, onto sensor 92, or other neither sensor. For these rays, the position, size, and shape of reflective means 24 is critical. In particular, if such rays strike a beveled edge, they may be directed away from both sensors. Such an edge represents a potential source of unacceptable image distortion.

Figure 5:
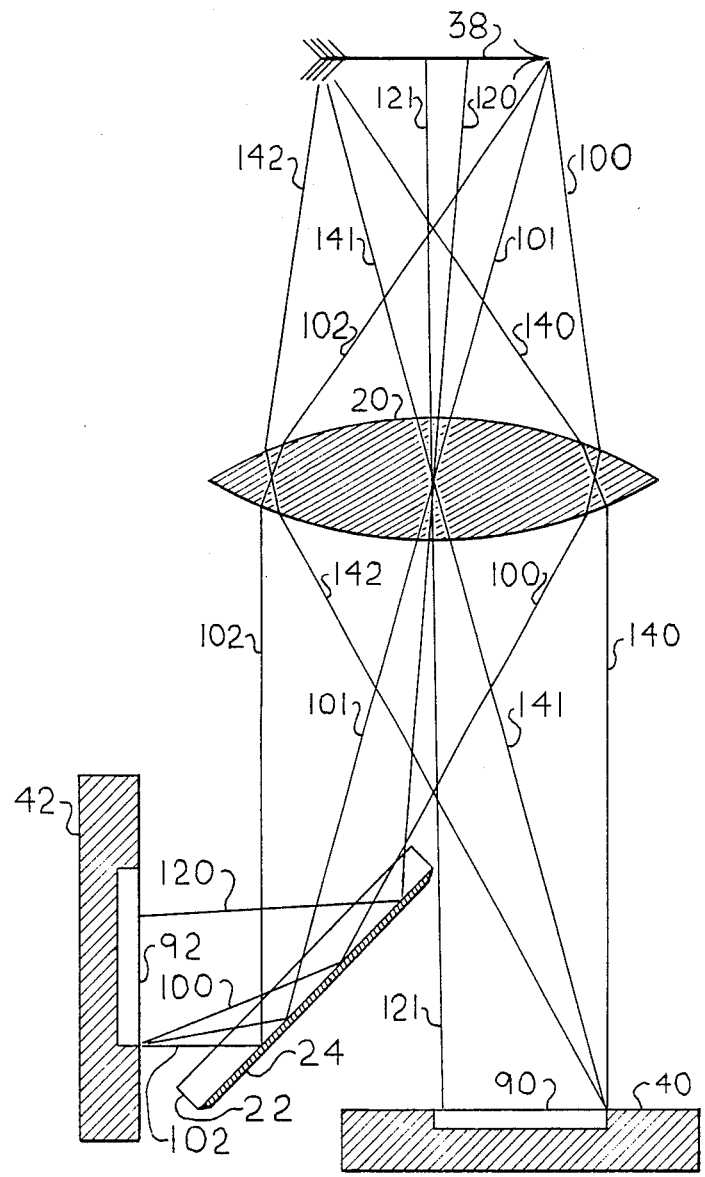
FIG. 5 is a top view showing a problem brought about when a simple mirror is used for the reflective means.

FIG. 5 shows the problem when a simple mirror is used as a reflective means. The mirror comprises a transparent glass supporting structure 22 and a metallic reflective surface 24. As in FIG 4, some of the chief rays between rays 120 and 121 are not likely to be properly directed toward a sensor. In particular, the edge of transparent supporting structure 22 closest to the focusing means 20 (of which only one point is visible in the drawing) is likely to cause problems. Also the narrow side of the transparent supporting structure 22 closest to the focusing means 20 (the length of which represents the thickness of the mirror) is likely to cause significant distortion unless carefully finished. These difficulties are overcome in FIG. 6 which shows supporting glass 22 of a simple, back-coated mirror extending into an area through which rays 121 and 140 pass. Note that reflective means 24 is NOT extended into this area.

Figure 7:
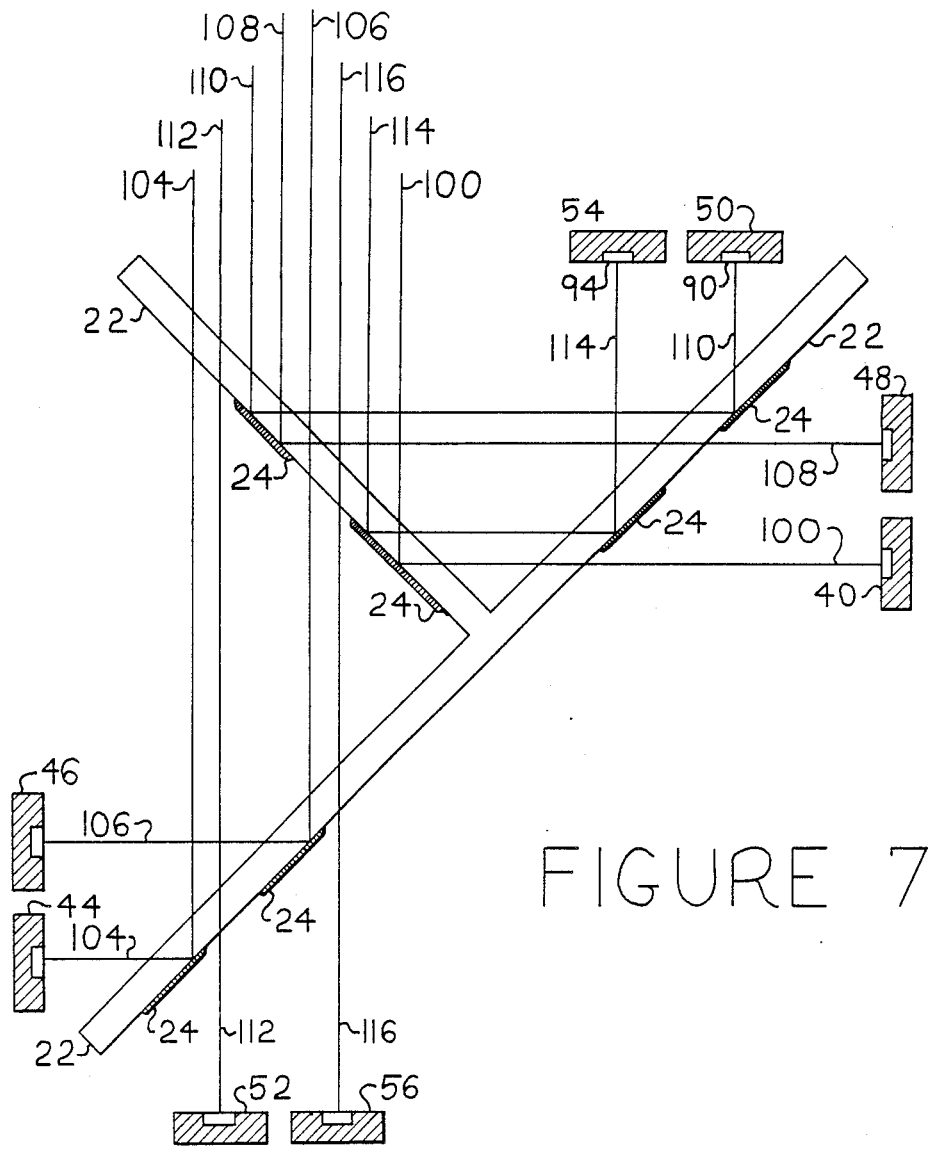
FIG. 7 is a top view showing a configuration which reduces the number of planes on which the sensors are placed and does not require the sensors to abut.

Designs using clear and mirrored sections of glass are often favored because, as will be seen, they allow sensors to be supported on a single plane such as a circuit board. FIG. 7 shows 8 rays presumed to have been directed from a distant object by a focusing means (neither of which is shown in the drawing) toward 8 individual sensors. Rays 112 and 116 show how a segment might travel directly to a sensor. Rays 104, 106, 100, and 108 show how segments might each be directed to a sensor after a single reflection. Rays 110 and 114 show how segments might be directed to a sensor after 2 reflections.

Figure 6:
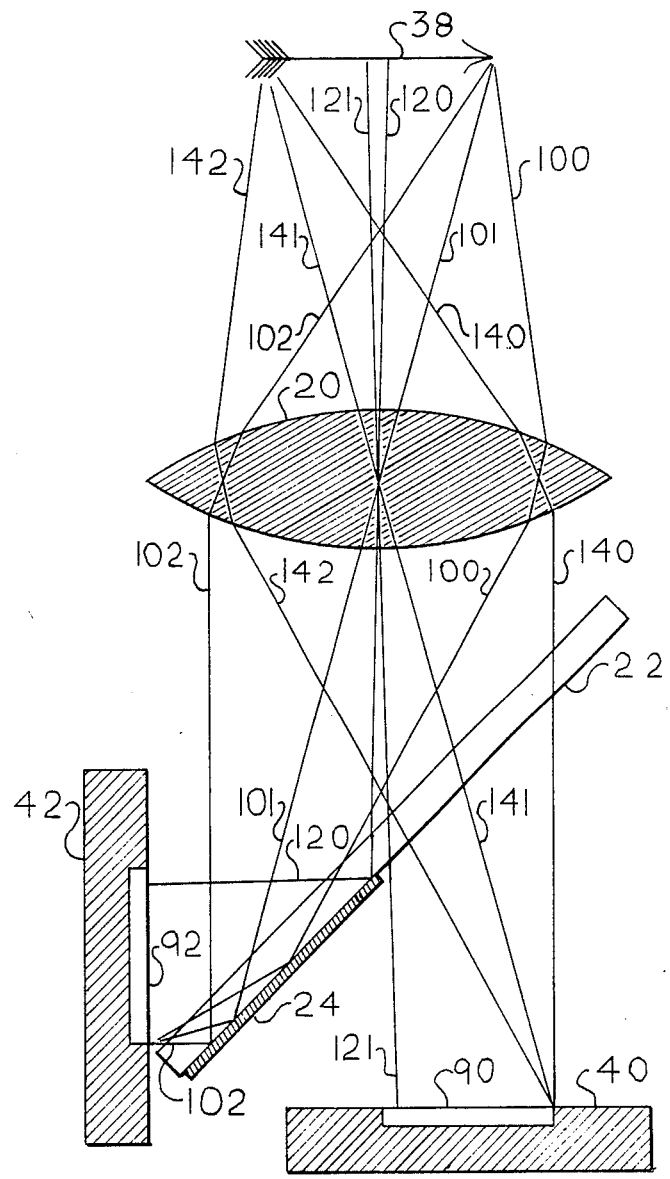
FIG. 6 is a top view showing how the problem introduced in FIG. 5 can be overcome.
Figure 8:
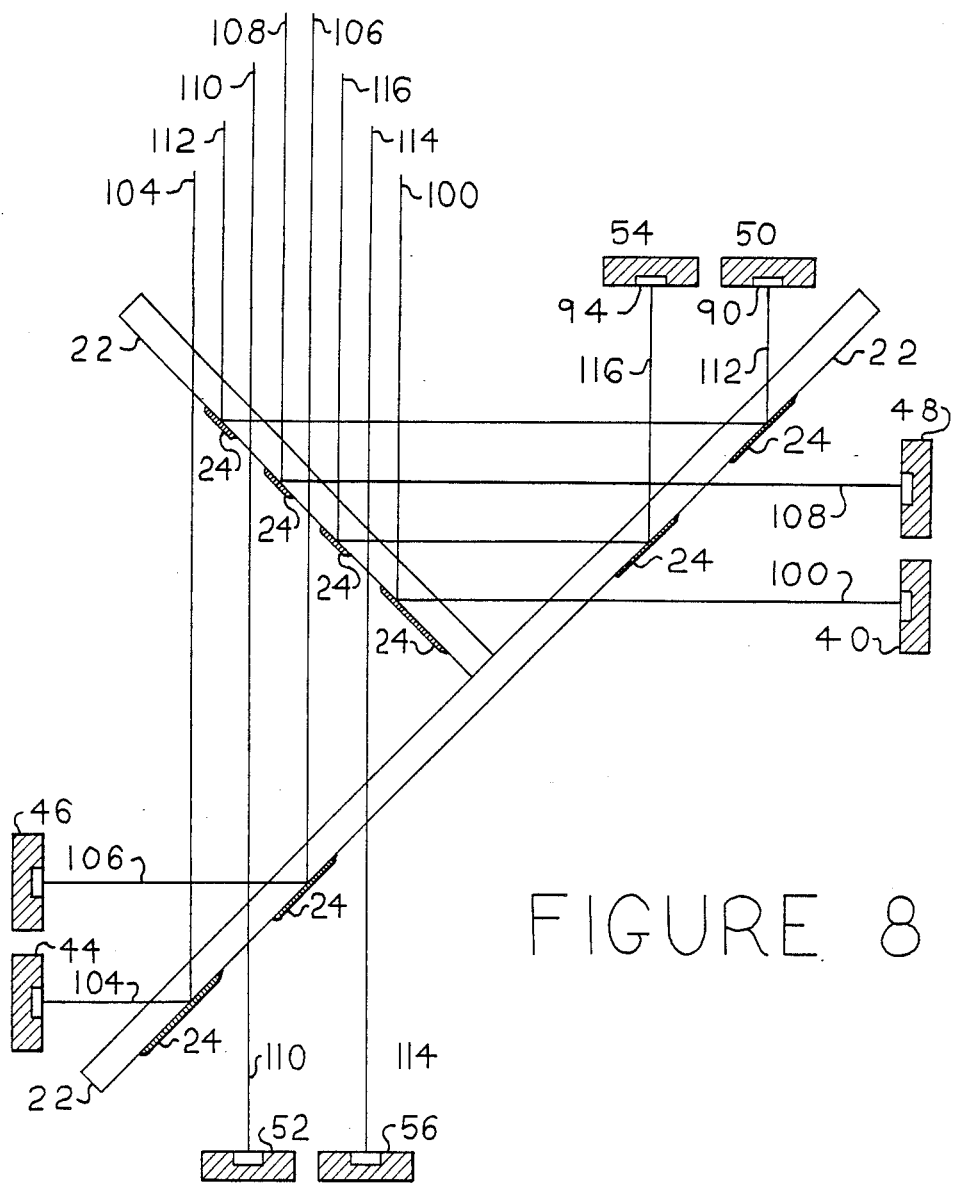
FIG. 8 shows an alternative design with the same property as the design shown in FIG. 7.

FIG. 7 demonstrates two important extensions to the ideas presented in FIG. 6. First, it shows that the design of FIG. 6 can be extended to tessellate the image into more than two image segments. Second, it shows how to arrange reflective means so that groups of sensors lie in the same plane (in addition to the plane of the paper). Looking at sensor supporting structures 50 and 54, we see that they are placed side by side and that their associated sensors 90 and 94 are separated by the distance required to accommodate rays 106, 108, and 116. This is because these rays are positioned between rays 110 and 114 which in turn determine the position of sensors 90 and 94. The design of FIG. 7 allows the distance between sensors to be greater than the length of the sensor supporting structure. When sensors must be kept separated, for example, because each one is physically surrounded by extensive supporting material, a design which pairs sub-sections "separated" by two or more sub-sections can be used. These pairs can then be reflected so as to enter sensors placed on the same plane. There is a wide range of design alternatives and extensions involving the number of reflections and the size, shape, and position of clear and reflective surfaces. FIG. 8 shows that the first reflections need not be of adjacent pairs of segments.

Figure 9:
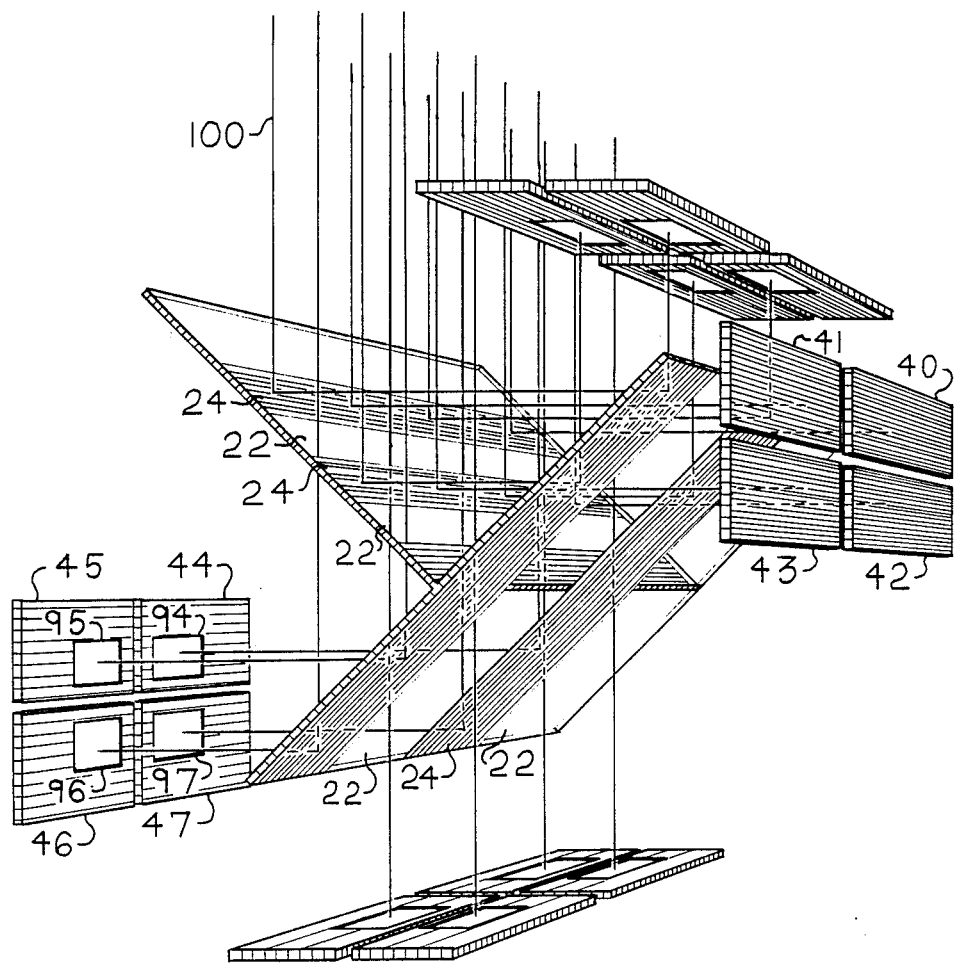
FIG. 9 is a perspective drawing of a design which effects two dimensional tessellation.

FIG. 9 shows how these ideas can be extended to two dimensional tessellation. Two dimensional tessellation takes place when the object sub-sections form a two dimensional pattern of two dimensional sub-sections rather than a linear one dimensional pattern of one or two dimensional sub-sections. Note that, by this definition, one dimensional tessellators can sense static two dimensional objects if the sensors are area arrays.

The 16 rays shown in FIG. 9 are presumed to have been directed toward the clear and reflective means of the figure by a distant focusing means. The rays are also presumed to have originated from a 4-by-4 pattern of sub-sections of some distant object. Neither the object nor focusing means is shown in the drawing. Each of these 16 rays represented the path taken by each of the 16 sub-sections of the distant object as they travel to four separate groups of four coplanar sensor supporting structures. Sensor supporting structures 40, 41, 42, and 43 form one coplanar group. Structures 44, 45, 46 and 47 form another. Notice that the focusing, reflective, and transparent supporting means restrict the positions of the sensors such as 94, 95, 96, and 97 but that the supporting structures 44, 45, 46, and 47 are not as limited. In particular, each supporting structure in this particular design, has one or two sides which can be easily extended to contain additional sensor support circuitry.

Figure 10:
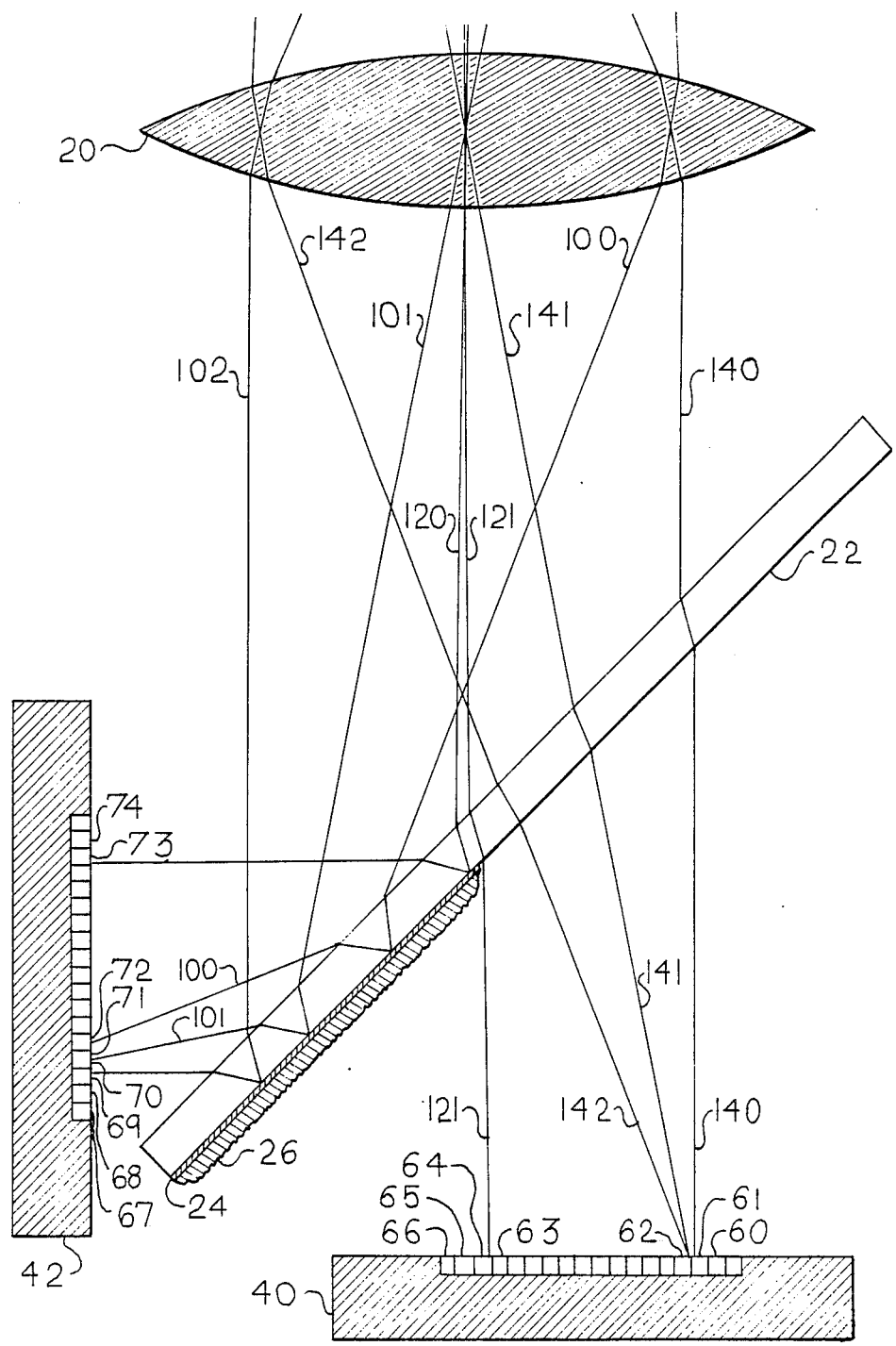
FIG. 10 is a top view giving more details concerning the transparent surface, the protective surface, and alignment.

FIG. 10 shows more structural details of the design shown previously in FIG. 6. The drawing is not to scale. In particular, the reflective surface 24 is usually very thin. The protective surface 26 is usually thicker than the reflective surface 24 but is still quite thin—typically the thickness of a coat of paint. The thickness of transparent surface 22 is typically of the order of 2 millimeters. Here the implication is that rays 120 and 121 are separated by the width of a fraction of a pixel so distortion after image reconstruction is inconsequential. The figure also shows the importance of carefully controlling the position and dimensions of the protective means 26 since it is typically much thicker than reflective means 24.

Also shown in FIG. 10 is refraction within the transparent supporting means 22. This refraction slightly alters the position of the sensors from the position that would be required if no transparent means were present. The exact position is a function of the transparent supporting mean's thickness and the refractive index. With these characteristics as drawn, rays 140, 141, and 142 are shown not to converge at a single point. Similarly, rays 100, 101, and 102 are shown not to converge. Also, because a symmetric bi-convex lens is shown as the focusing means, other aberrations will be apparent if accurate ray traces are made. Such aberrations can be minimized using classical optical design techniques. Under some circumstances, first-surface mirrors may be used to advantage.

Assume for a moment that rays 121 and 140 in FIG. 10 delimit the portion of the image segment which is to be processed by the sensors supported by the supporting structure 40. Similarly, assume rays 120 and 102 delimit the portion of the image segment to be processed by the sensors supported by structure 42. In particular, we see ray 140 falls onto sensing element 61, ray 121 onto sensing element 64, ray 120 onto sensing element 73, and ray 102 onto sensing element 69. Note, however, that these sensing elements are not the end elements and that sensing elements 60, 65, 66, 67, 68, and 74 (among others) are not used. In this particular design, the exact position of rays 120 and 121 are assumed unknown because of variations in the position of reflective means 24. This design allows for the dynamic alignment of the device. In other words, sensing elements are wasted and the image reconstructed by making the pixels that correspond to sensing elements 64 and 73 be either adjacent or joined as components of a single pixel of the final composite image.

Figure 11:
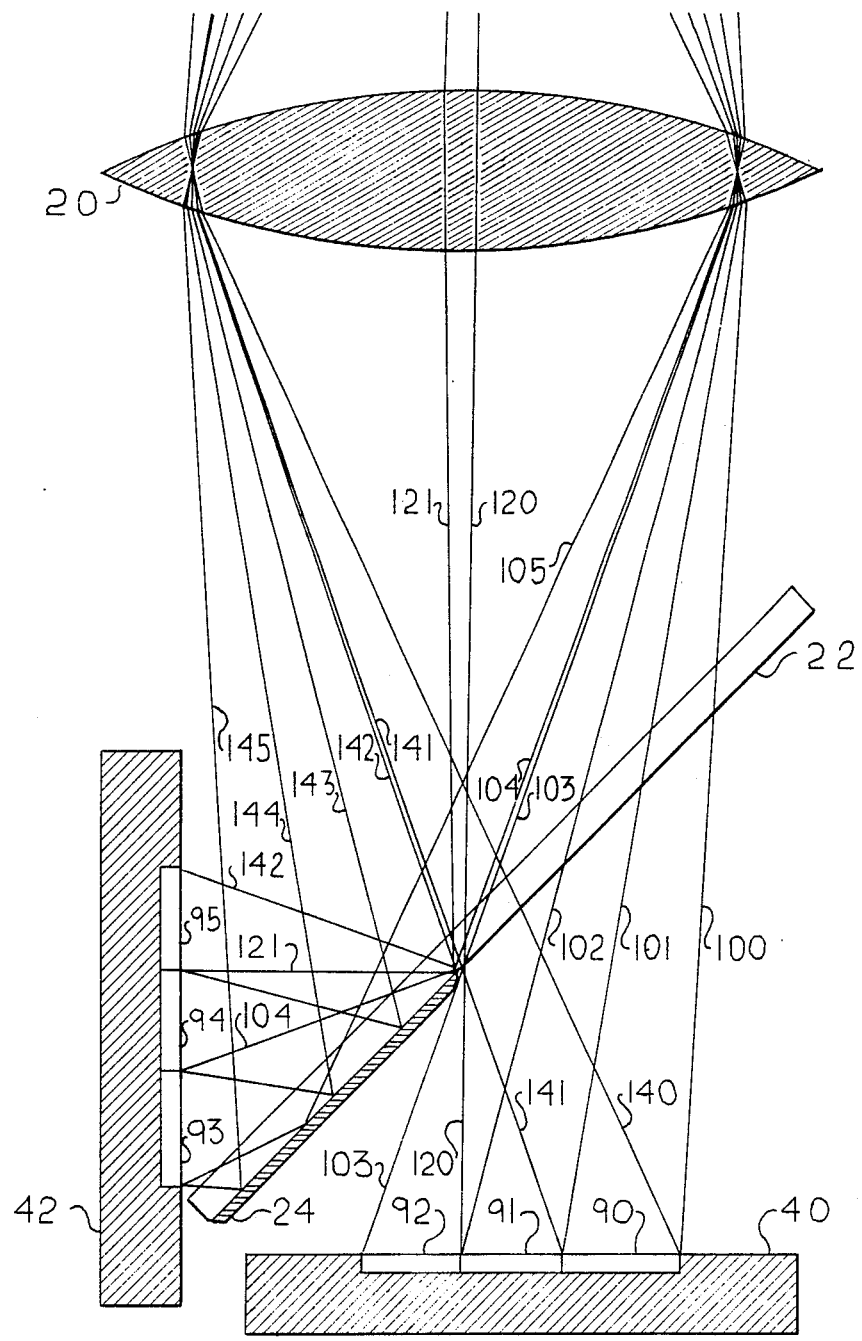
FIG. 11 is a top view used to describe an important type of image distortion occurring during the operation of some tessellators.

The previous descriptions have ignored details of the effect of placing the reflective means within a partially focused beam. FIG. 11 can be used to analyze the effect of doing so. In this drawing, a simple optical lens 20 is used as a focusing means. The drawing has been simplified by assuming there is no refraction by transparent supporting structure 22.

Consider rays 101 and 141. Both contribute to a single point on the image plane where the two rays intersect. Similarly, all the points within sensor area 90 receive rays which pass through every point of the lens. Sensor 93 also receives all of the rays emanating from every point of the lens but via a reflection from reflective means 24. We see, however, that sensor areas 91 and 92 receives some rays, while others are blocked by the reflective means 24. For example, there are an infinite number of rays which emanate from the focusing means between the intersection of the surface of focusing means 20 (nearest sensor 91) and ray 102, and the intersection of the surface of focusing means 20 (nearest sensor 91) and ray 120, which contribute to the point where rays 102 and 120 intersect. Similarly rays which emanate from the focusing means between the intersection of the surface of focusing means 20 and ray 121 and the intersection of the surface of focusing means 20 and ray 143, which would contribute to the same point were the reflective means 24 not present, originated from the same point of the object and are reflected by reflective means 24 to the intersection of 121 and 143. Similarly, rays 103 and 144 emanate from the same point on the object and yet are focused on different sensors. Thus the image focused on sensor 91 is seen to be the same as that focused on sensor 95. Similarly, sensor 94 will receive a duplicate of the image focused on sensor 92. We speak of the image formed on the sensors of structure 40 as "overlapping" the image formed on the sensors of structure 42. One may also observe that the image falling on sensor 91 is brighter than that falling on sensor 95, and the image falling on sensor 94 is brighter than that falling on sensor 92.

Areas 91, 92, 94, and 95 will usually be the same size. Their size relative to areas 90 and 93, however, will be determined by lens size (effective aperture), lens focal length, placement of the reflective means, and the required image area.

Notice in FIG. 11 that, relative to focusing means 20, the position of sensors 90, 91, and 92 are fixed. We can, however, more reflective means 24 closer to focusing means 20 than is shown in the figure. Assume the 45-degree angle that reflective means 24 makes with the sensing surface of the sensors is kept unchanged. As reflective means 24 is moved along the optical axis of, and closer to, the focusing means 20, sensor area 91 increases and sensor area 90 decreases. The sum of these two areas remains constant. In addition, area 92 increases, and it is this increase which increases the total required sensor area. For the specific design shown in FIG. 11, when a portion of the reflective means 24 first reaches the intersection of rays 140 and 105, the size of sensor area 90 goes to zero. At this point, if we appropriately increase sensor area 92, then sensors 90, 91, and 92 view an image of the entire object. In such a position, reflective means 24 is said to be at the minimum tessellating distance. This distance is defined as the distance beyond which the reflective means, or portions thereof, must be placed from the central optical plane of the focusing means in order that there be at least one individual sensing means, i.e., set of adjacent sensing elements, that senses less than the entire area of the object. Furthermore, this condition must be a result of the position of the reflective means therein and not the result of a limited sensor area. A similar analysis of sensors 93, 94, and 95 will yield similar results and the same minimum tessellating distance. However, these sensors must be moved whenever reflective means 24 is moved to properly receive the reflected image.

Suppose that each image point is focused on a surface and no reflective means is present. For each object point, assign an intensity value of 1 as the absolute value of the intensity on corresponding surface point. With reflective means 24 present and in the position shown in FIG. 11, the images on sensor areas 90 and 93 are seen to have intensity value 1, assuming reflective means 24 is a perfect reflector. The images that form on sensor areas 91, 92, 94, and 95 will be darkened and have values between 0 and 1. As we move reflective means 24 closer to the focusing means 20, the image intensity on the sensors becomes more even. When the reflective means 24 is placed against the focusing means 20, the image intensity is 0.5 on all parts of all sensors. We have effectively split the focusing means 20 into two smaller focusing means. Such a design is equivalent to using a half-silvered mirror which also produces two full-size, half-intensity images. Although such systems can sense images at high resolution, the decreased image intensity is a distinct disadvantage. In contrast, the tessellator designs of this application do not suffer from this defect. Instead, every part of the image produced by the focusing means falls on some sensor. However, the maximum resolution is obtained when sensor areas 90 and 93 are made as large as possible and areas 91, 92, 94 and 95 are made as small as possible. This condition occurs when the reflective means 24 is as close to sensor supporting structure 40 as is possible (while still maintaining the 45-degree angle with the sensor surfaces and reflecting the rays between 142 and 145 to sensors 93, 94, and 95). In other words, maximum resolution of the system occurs when the reflective means 24 is as far from the focusing means 20 as is possible. As mentioned above, with the reflective means in this position, there is usually observable image distortion in the form of intensity variations. However, this "distortion" can be easily corrected, as explained shortly.

Figure 12:
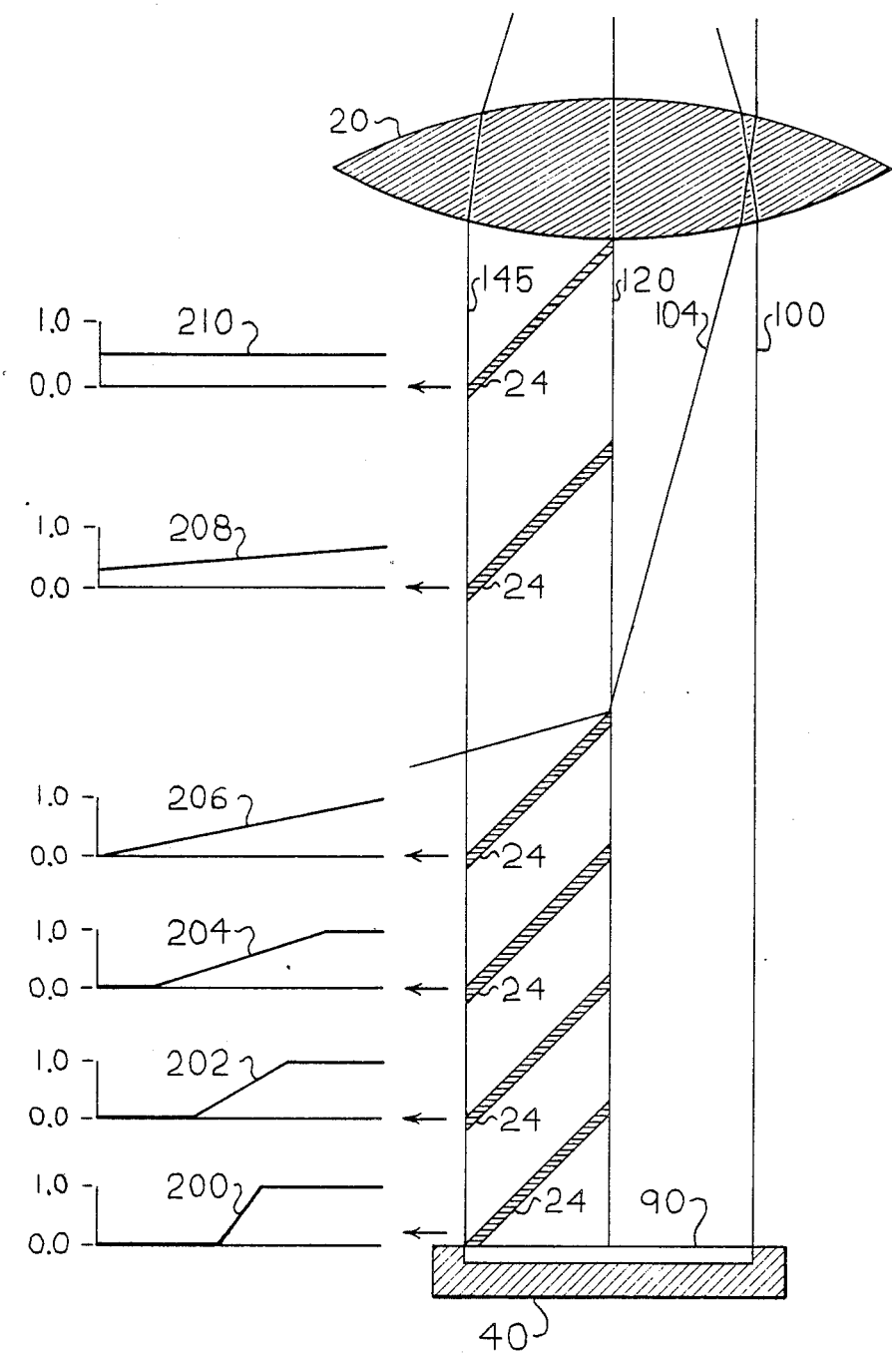
FIG. 12 is a top view of part of a simple tessellator. It shows the intensity functions that result when a reflective means is placed in various positions.

FIG. 12 shows more precisely the nature of the image intensity variations as a function of the position of the reflective means. In that figure, it is to be understood that a complete tessellator would require the additional sensor supporting structure 42 and associated sensors shown in FIG. 11. The intensity graphs shown, use the ordinate to represent relative intensity. A value of 1.0 is the intensity value of the image if no reflective means were present. The value of 0.0 indicates no rays reach the sensor. Intermediate values are directly proportional to the area of the lens which contributes to the image of a given point. The abscissa of each intensity graph gives the position across a potential sensor area of supporting structure 40.

Intensity function 200 results when the reflective means 24 is placed as close to sensor 90 as possible (given the previously explained conditions). All the intensity function values which are greater than 0.0 and less than 1.0 represent points of the object which are sensed by more than one sensor, since we assume, in this case, that sensors are used to exactly span the non-zero values shown in the graph. We will refer to these points on the graph as being "overlapping image points," or simply "overlapping points," since their position corresponds to object points which are viewed by more than one sensor. To reconstruct an image of the object, every non-zero sensor value must be used. The sensor values for overlapping points must effectively be added together in order to properly reconstruct the image. (Here we are ignoring the technicality that the sensors must be linear in response to the intensity of the object.)

There are many ways of "effectively adding" sensor values together. These include, but are not limited to, the following: digital reconstruction from knowledge of the intensity fall-off characteristics (in which case areas 92 and 95 of FIG. 11 do not actually have to be serviced by any sensing elements), analog pixel value addition, and digital pixel value addition. If the image sensors are strips of photographic film, then combining pixels during enlargement might simply consist of overlapping projected image segments.

In FIG. 12, the assumption is made that the intensity of rays contributing to the formation of each point of the image is the same for each position along the face of the focusing means 20. This allows us to draw the line segment representing the overlapping points as a straight line segments. If this assumption is false, the curves for the overlapping points are more complex, but the results are essentially the same. The intensity function for the sensor not shown in FIG. 12 (but shown in FIG. 11) would be function 200 reflected about the line with equation $Y=0.5$. In other words, the equation for this function is $1.0-G(x)$, where $G(x)$ is the equation for function 200. Adding such a function with function 200 results in a constant function $F(x)=1.0$. Thus all of the original intensity values are properly reconstructed.

As the reflective means 24 is moved closer to focusing means 20, the section of the function representing overlapping points covers a greater length along the abscissa and has less of a slope. Function 206 shows intensity values present when the reflective means is placed at the minimum tessellating distance. That position occurs when the edge of reflective means 24 closest to the focusing means 20 is at the intersection of rays 120 and 104. Note that function 206 shows a non-zero intensity for sensor 90 across virtually its entire face. This is because in this position sensor 90 views the entire object. As reflective means 24 is moved still close to the focusing means 20, the entire object continues to be viewed but the intensity variations is less. Function 208 shows this situation for one such position.

Finally, function 210 shows the results of placing the reflective means as close to the focusing means 20 as possible. Here again, the entire object is viewed but at a relative intensity value of 0.5 since only half of the focusing means is used. Note that in every position of the reflective means, adding pixel values from the tessellator's sensors that correspond to the same point on the object will result in an intensity value of 1.0. However, once the reflective means 24 is closer to the focusing means 20 than the minimum tessellating distance, the entire object is visible to both sensors. If, under such circumstances, we choose to use only one sensor to view part of the object, the result will be a decreased image intensity available for image reconstruction. Having two sensors view an image at half-intensity is not generally a useful tessellator design, since the less expensive alternative of using a single sensor with no reflective means produces the same result.

On the other hand, moving the reflective means as close to the sensing means as possible has two desirable effects. First, the sensor size required by the design is decreased. Given a fixed sensor size, this is equivalent to increasing the available resolution of the tessellator. Second, the number of overlapping pixels which must be "added" together to produce the proper intensity levels is decreased. In some cases this allows image reconstruction to take place faster.

Figure 13:
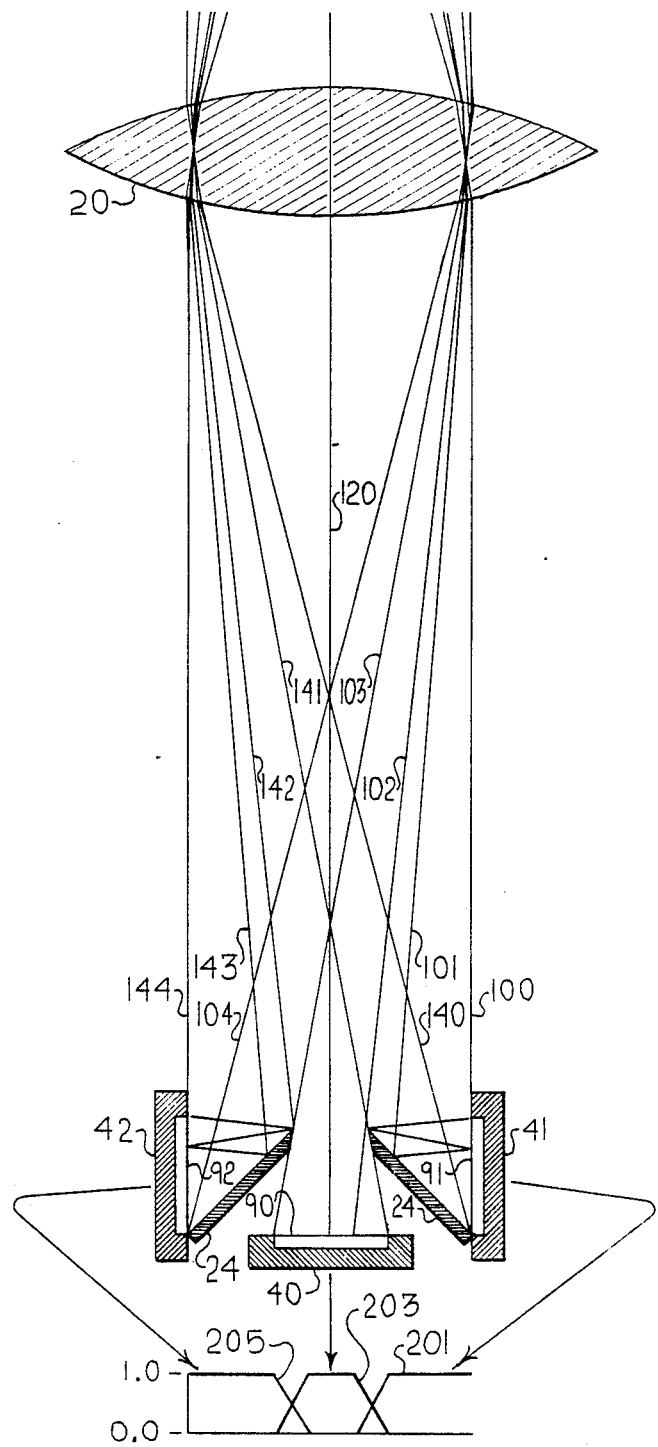
FIG. 13 is a top view of a tessellator constructed with two reflective means. Also shown is a graph of three intensity functions.

Because moving the reflective means closer to the sensors is so advantageous, the following question naturally arises: is it also advantageous to use a greater number of smaller reflective means, since they can be placed closer to the sensing means? For example, is it better to use the design of FIG. 13 rather than that of FIG. 11? An examination of FIG. 13 shows that the answer to this question is complex. Here we have decreased the size of the reflective means 24 and tessellated the image in such a way that 3 sensors of equal size can be used. Intensity function 201 is for the area serviced by sensor 91. Similarly, intensity functions 203 and 205 are for the areas serviced by sensors 90 and 92 respectively. The minimum required sensor sizes can be determined by examining the domain corresponding to non-zero function values of each of the three functions. The reflective means 24 have been positioned so that the minimum sensor size is the same for all three sensors. This minimum sensor size is smaller than that required in the design of FIG. 12 as can be determined from an examination of FIG. 12's function 200. Of course, FIG. 12 requires only two sensors while FIG. 13 requires three. To properly reconstruct the image in FIG. 13, the overlapping points of function 201 must be added to the corresponding points of function 203. The number of such pixels is less than the number required in function 200 of FIG. 12. A similar result will be obtained for the overlapping points of functions 205 and 203. This means that, for each pair of sensors, there are fewer pixels to reconstruct in FIG. 13 than in FIG. 12. However, the total number of overlapping pixels in function 203 is greater than the total number of overlapping pixels in function 200 of FIG. 12. This means that the total number of pixels that must be reconstructed is greater in FIG. 13 than in FIG. 12. It therefore is seen that when trying to determine the performance and cost of alternative tessellator designs, a complex interaction of factors may arise which involve the number of sensors, sensor size, sensor cost, sensor resolution, tessellator resolution, image intensity, image overlap, and reflective means placement. However, given a fixed number of sensors, it is generally advantageous to place the reflective means as close to those sensors as possible.

Figure 14:
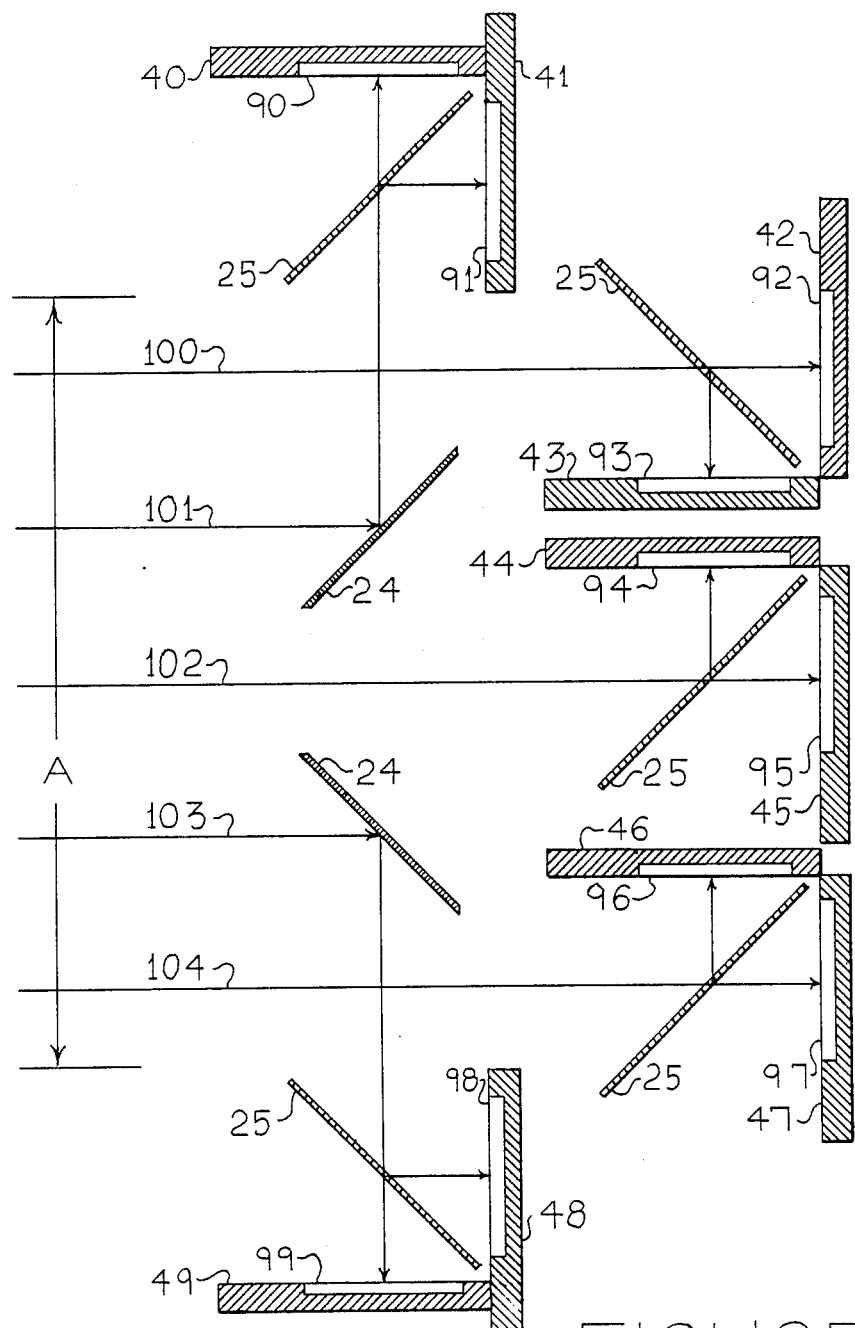
FIG. 14 is a top view of part of a 5×N tessellator.

Although FIG. 9 shows how to effect 2-dimensional tessellation, the design has the disadvantage of keeping the reflective means relatively distant from the sensors. Note in particular, the position of the first reflective means 24 which reflects ray 100. As explained in the previous paragraph, given a fixed number of sensors, the inability to move this reflective means closer to the sensors decreases available tessellator resolution. FIG. 14 shows how to reflective means can be positioned so as to increase the systems's resolution. In FIG. 14, 5 image segments represented by rays 100, 101, 102, 103, and 104 enter from the left of the diagram from a focusing means not shown in the drawing. These 5 segments have a total width represented by distance A. Rays 101 and 103 are shown to reflect off of reflective means 24, which directs them to other areas of the device. In addition, these reflective means 24 provide an area where additional sensors 93, 94, and 96 and their associated supports 43, 44, and 46 can be placed. Sensors 90, 91, 98, and 99 and their associated supports 40, 41, 48, and 49 are similarly "hidden" off to the side of the outermost rays 100 and 104. Thus, we can decrease the distance from reflective means to sensors by choosing the proper position for the elements of the tessellator. Note that sensors 92, 95 and 97 can not be placed closer to reflective means 24 than shown because doing so would force supporting structures 41 and 48 to block rays viewed by sensors 92, 93, 96, or 97. (All path lengths from the focusing means to the sensors must be kept constant in order for the image to be properly focused on the sensors.)

Note that, in FIG. 14, the sensors are placed off center within their respective supporting structures. Note also that, if necessary, it is possible to increase one side of each of the supporting structures to varying degrees.

Figure 15:
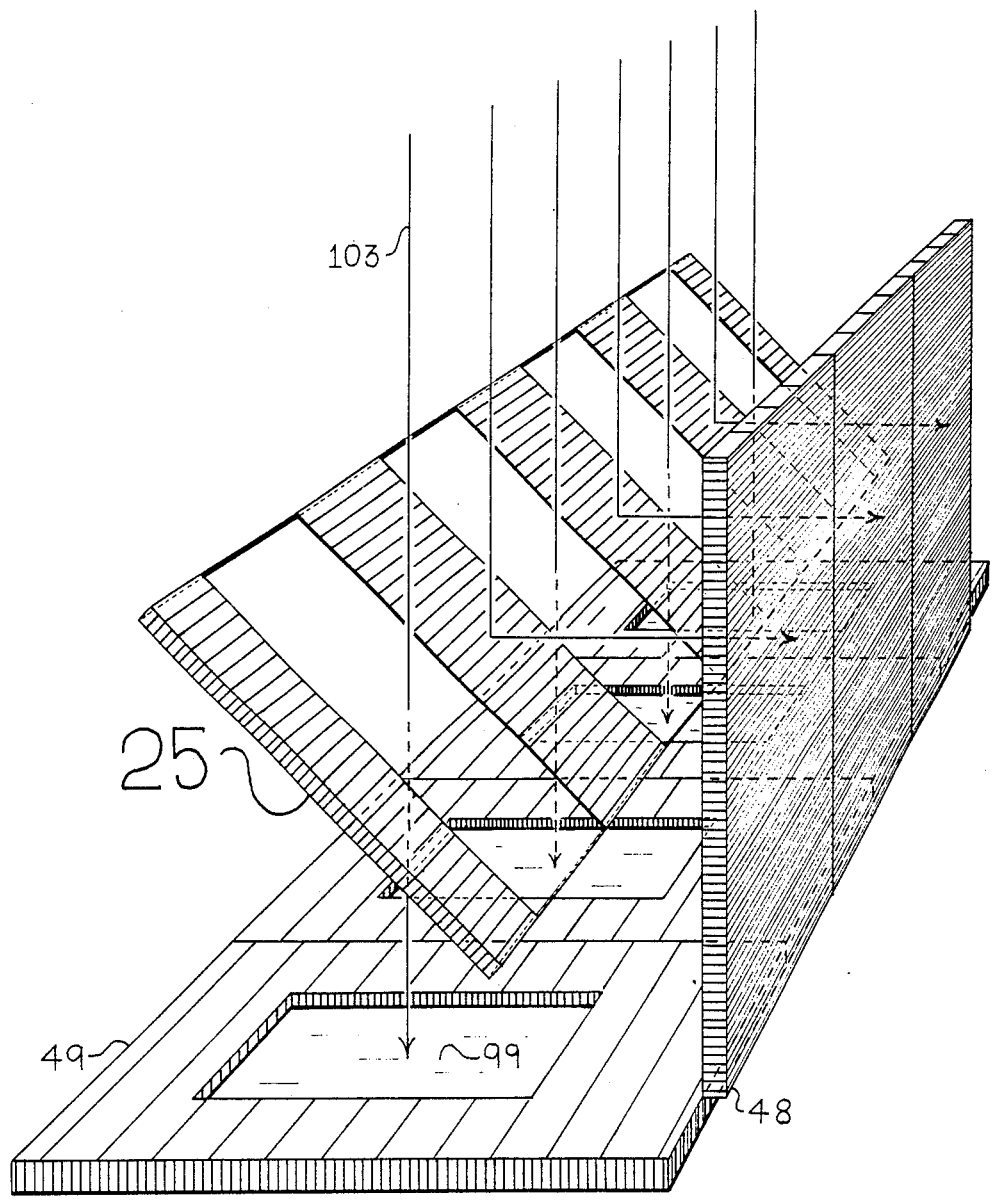
FIG. 15 is a perspective drawing of a T1 component.

The device of FIG. 14 is actually a 5×N, 2-dimensional tessellator, where N can be any arbitrary integer greater than one. FIG. 15 is a perspective drawing showing the essentials of the hidden dimension of the structure at the bottom of FIG. 14 which includes sensors 98 and 99. Although FIG. 15 shows a device with N=7, it should be clear that arbitrary integral values of N greater than one can be supported.

FIG. 15 depicts a Type 1 Tessellator Component. This component is also referred to as a T1 component. The object marked as 25 is a T1 reflective means. It is composed of a plurality of alternating clear and reflective means which are placed adjacent to each other, have a similar orientation, and are arranged in a linear pattern within a single plane. The clear means might be either transparent substances or spaces where no material is present. Object 25 is referred to as a "T1 reflective means" even though it is understood that only some parts are reflective. In FIG. 15, the edge of the T1 reflective means marked with reference numeral "25" corresponds to the visible edge of a similar component at the bottom of FIG. 14.

FIG. 15 is called a "7 element T1 component", or a "T1 component of length 7" because it contains 7 sensors. In general, T1 components are useful in designing 2-dimensional tessellators, since the length along which they can image can be increased arbitrarily by simply adding sensors and extending the T1 reflective means with additional clear and reflective means. Observe that in FIG. 15, some sides of supporting structure 49 are limited by adjacent sensor supporting structures or the possible extensions of non-adjacent sensor supporting structures such as those of supporting structure 48, while other sides can be extended more freely.

Although FIG. 14 shows a 5×N device, it should be clear how to construct M×N devices for values of M from 1 through 4, as well. For example, using only that part of the design associated with rays 102 and 103, we can create a 2×N device. In this case, we can improve the resolution by moving the T1 components closer to the reflective means 24 associated with ray 103. Similarly, we can create a 3×N device using the parts of FIG. 14 associated with rays 101, 102, and 103. Again, resolution can be improved by moving the sensors closer to the reflective means 24.

CONCLUSION, RAMIFICATIONS, AND SCOPE OF INVENTION

The previous section describes how to construct a tessellator which allows many small components to be used in place of a single large one. The designs presented are simple, inexpensive, easy to manufacture, and easy to align. The distortion introduced through this means of tessellation can be easily and inexpensively corrected. It is further shown how One dimensional tessellation can be effected using simple mirrors (FIG. 2), two dimensional tessellation can be effected using glass with mirrored sections (FIG. 9), extensions easily support an arbitrary number of segments (FIGS. 7, 8, 9, 14, and 15), many of the sensing or generating elements can be placed on the same plane (FIGS. 7, 8, 9, 14, and 15).

While the previous descriptions contain many specificities, these should not be construed as limitations on the scope of the invention, but rather as exemplifications of several preferred embodiments thereof. Many additional variations are possible. For example, the reflective means can be arranged to accommodate sensing devices whose supporting structure is many times the size of the sensors themselves. The sensing elements can be replaced by image generating elements to create a device that can create an image from multiple sub-sections. A device can be built to tessellate waves of other than electromagnetic radiation. For example, a speaker system can be created by replacing the sensors with small speakers and using a parabolic reflector as the focusing means. Accordingly, the scope of the invention should be determined not by the embodiments illustrated, but by the appended claims and their legal equivalents.

For convenience, the following definitions are given:

Definition:

A tessellator is a device which creates or separates an image formed by electromagnetic radiation, sound, or similar waves from or into a plurality of separate image sub-sections. Such sub-sections are called segments or tiles. It differs from a beam splitter which does not treat electromagnetic radiation as an image forming medium. It differs from a machine that assembles porcelain tiles into a mosaic because the image formed by such a machine is not created from waves or wavelike particles.

I claim:

1. A tessellator comprising (a) a focusing means used to form a set of electromagnetic waves into a clear image,
(b) a plurality of target elements, upon each of which is directed a segment of said clear image,
(c) at least one reflective means positioned along the path taken by the electromagnetic waves as they travel from said focusing means to said target elements, said reflective means positioned farther from said focusing means than a minimum tessellating distance to direct at least one section of said electromagnetic waves to at least one of said individual target elements.

2. A tessellator as described in claim 1 further comprising a plurality of reflective means, positioned farther from said focusing means than a minimum tessellating distance and divided into two non-empty sets denoted as a first reflective set and a second reflective set, wherein said plurality of reflective means are positioned along the path taken by the electromagnetic waves as they travel from said focusing means to said target elements and are positioned in such a way that one section of said electromagnetic waves travels directly from said focusing means to one of said targets, and wherein a second section of said electromagnetic waves travels from said focusing means to one of said reflective means of said first reflective set and travels from said one of said reflective means of said first reflective set to a second of said targets, and wherein a third section of said electromagnetic waves travels from said focusing means to a second of said reflective means of said first reflective set, travels from said second of said reflective means of said first reflective set to one of said reflective means of said second reflective set, and travels from said one of said reflective means of said second reflective set to a third of said targets.

3. A tessellator as described in claim 2 wherein said reflective means from said first set are divided into two subsets denoted first subset and second subset, and wherein the reflective surface of all said reflective means of said first subset are coplanar and the reflective surface of all said reflective means of said second subset are coplanar and the said reflective surface of every said reflective means of said first subset is perpendicular to the said reflective surface of every said reflective means of said second subset and wherein the reflective surface of every said reflective means from said second set of said reflective means is coplanar with the said reflective surface of every said reflective means of said second subset.

4. A tessellator as described in claim 3 in combination with a tessellated object intensity dropoff area compensation means.

5. A tessellator as described in claim 2 in combination with a tessellated object intensity dropoff area compensation means.

6. A tessellator as described in claim 1 wherein at least one clear means and at least one of said reflective means are placed adjacent to each other in a linear arrangement, each of said clear means that is not the last of said linear arrangement followed by one of said reflective means and each of said reflective means that is not the last of said linear arrangement followed by one of said clear means.

7. A tessellator as described in claim 1 in combination with a tessellated object intensity dropoff area compensation means.

8. A tessellator as described in claim 7 wherein a section of said electromagnetic waves passes through a transparent material adjacent to said reflective means, said transparent material extending beyond the area of said reflective means whereby said section of said electromagnetic waves may pass through said extension and whereby image distortion is decreased over that if said extension had not been made.

9. A tessellator as described in claim 1 wherein a section of said electromagnetic waves passes through a transparent material adjacent to said reflective means, said transparent material extending beyond the area of said reflective means whereby said section of said electromagnetic waves may pass through said extension and whereby image distortion is decreased over that if said extension had not been made.

10. A tessellator as described in claim 1 wherein one of said reflective means is denoted primary reflective means and wherein from the set of said reflective means less said primary reflective means, are selected two non-intersecting, non-null subsets denoted first reflective means subset and second reflective means subset and wherein from all clear means are selected two non-intersecting, non-null subsets denoted first clear means subset and second clear means subset and wherein a set denoted first combined means of the union of said first reflective means subset and said first clear means subset, all the elements of said first combined means placed in a linear arrangement, each element of said first clear means subset that is not the last of said linear arrangement of said elements of said first combined means is followed by an element of said first reflective means subset and each element of said first reflective means subset that is not the last of said linear arrangement of said elements of said first combined means is followed by an element of said first clear means subset, and wherein a set denoted second combined means of the union of said second reflective means subset and said second clear means subset, all the elements of said second combined means placed in a linear arrangement, each element of said second clear means subset that is not the last of said linear arrangement of said elements of said second combined means is followed by an element of said second reflective means subset and each element of said second reflective means subset that is not the last of said linear arrangement of said elements of said second combined means is followed by an element of said second clear means subset, and wherein said primary reflective means is arranged in such a position between said focusing means and said first combined means as to direct a set of sections of said electromagnetic waves from said focusing means to said elements of said first reflective means subset and thence to a set of said target means and to direct a second set of sections of said electromagnetic waves from said focusing means to said elements of said first clear means subset and hence to a second set of said target means.

* * * * *